United States Patent
Kuo

(10) Patent No.: US 7,038,857 B1
(45) Date of Patent: May 2, 2006

(54) PROJECTION ZOOM LENS

(75) Inventor: Chung-Yuan Kuo, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/290,676

(22) Filed: Nov. 29, 2005

(30) Foreign Application Priority Data

May 12, 2005 (TW) ............................... 94115326 A

(51) Int. Cl.
*G02B 15/14* (2006.01)
*G02B 9/00* (2006.01)

(52) U.S. Cl. .................. 359/680; 359/691; 359/649
(58) Field of Classification Search ............ 359/680, 359/691, 692, 649–651, 749–756, 793–795
See application file for complete search history.

(56) References Cited

U.S. PATENT DOCUMENTS

| | | | |
|---|---|---|---|
| 5,619,381 A | 4/1997 | Doug | 359/677 |
| 5,936,780 A * | 8/1999 | Chuang et al. | 359/691 |
| 6,147,812 A * | 11/2000 | Narimatsu et al. | 359/691 |
| 6,590,716 B1 | 7/2003 | Shuji | 359/679 |
| 6,801,367 B1 * | 10/2004 | Nagahara | 359/680 |

* cited by examiner

*Primary Examiner*—Hung X Dang
*Assistant Examiner*—M. Hasan
(74) *Attorney, Agent, or Firm*—Madson & Austin

(57) ABSTRACT

A projection zoom lens includes, from an image side to an object side, a first lens group having a negative refractive power, consisting of a number of lens elements and being movable along the optical axis of the projection zoom lens; a second lens group having a positive refractive power, consisting of a number of lens elements and being movable along the optical axis of the projection zoom lens; and an aperture stop arranged between two lens elements of the second lens group and being axially movable therewith.

13 Claims, 15 Drawing Sheets

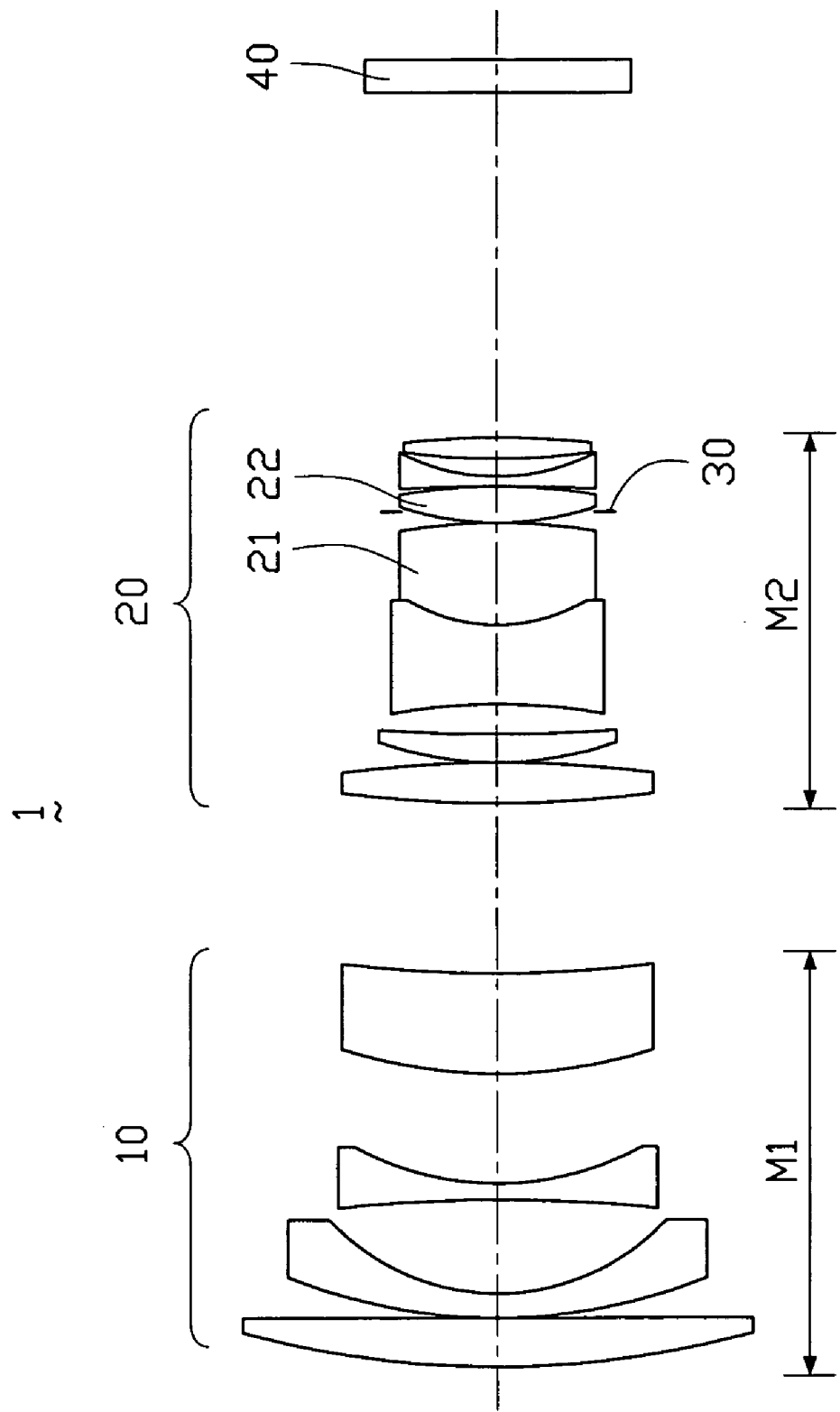

-0.10   0.00   0.10 (mm)
LONGITUDINAL SPHERICAL ABERRATION

-10.00   0.00   10.00 (µm)
LATERAL CHROMATIC ABERRATION

-0.10   0.00   0.10 (mm)
FIELD CURVATURE

LONGITUDINAL SPHERICAL ABERRATION

LATERAL CHROMATIC ABERRATION

FIELD CURVATURE

LONGITUDINAL SPHERICAL ABERRATION

LATERAL CHROMATIC ABERRATION

FIELD CURVATURE

SPATIAL FREQUENCY

LONGITUDINAL SPHERICAL ABERRATION

LATERAL CHROMATIC ABERRATION

FIELD CURVATURE

LONGITUDINAL SPHERICAL ABERRATION

LATERAL CHROMATIC ABERRATION

PROJECTION ZOOM LENS

BACKGROUND OF THE INVENTION

1. Field of the Invention

The present invention relates to a projection zoom lens, and more particularly to a projection zoom lens for use in a projection optical system of a projector and also use in an image-taking optical system of an image-taking device.

2. Description of the Prior Art

Projectors, such as a CRT (Cathode Ray Tube) projector, an LCD (Liquid Crystal Display) projector, a DLP (Digital Light Processing) projector, and an LCoS (Liquid Crystal on Silicon) projector, can project an image or other information on a large screen. For example, a projection optical system of the DLP projector uses a DMD (Digital Micro-mirror Device) modulator as a light valve, wherein minute mirror-surface elements (micro-mirrors) are arranged in an array corresponding to pixels and form an image by controlling the angles of the respective mirror-surfaces, and a projection zoom lens enlarges said image to be displayed on the large screen.

Quality of a projection image displayed on the large screen is generally determined by the light valve, the projection zoom lens, and other imaging components thereof. Generally, the projection zoom lens is a compound lens composed of a combination of a plurality of lenses, at least including a converging lens and a diverging lens, and is used to minimize deterioration in resolution, spherical aberration, chromatic aberration, and other type of aberrations.

A conditional projection zoom lens, which is disclosed in U.S. Pat. No. 6,590,716 B2, comprises a first lens group having a negative refractive power, a second lens group having a positive refractive power, a third lens group having a negative refractive power, and a fourth lens group having a positive refractive power. Although the conditional projection zoom lens effectively reduces aberrations and improves the quality of a projected image, it is not fit for use in projectors because an optical system employing the four-group zoom lens will be bulky, and the manufacturing cost thereof will be increased and the assembly thereof will be complicated.

U.S. Pat. No. 5,619,381 discloses a two-group movable lens, including a zoom lens group having a negative refractive power and a compensator group having a positive refractive power. Both groups contain at least one aspheric lens element for elimination of aberrations. A projection optical system employing the movable lens groups has a low distortion and high resolution with fewer lens elements. However, this patent only roughly introduces the configuration and the function of the two-group movable lens, and does not provide any detailed description of conditions and parameters necessary to the design.

Hence, it still needs to provide a projection zoom lens for resolving the question of aberrations existing in the currently available designs and devices.

BRIEF SUMMARY OF THE INVENTION

Accordingly, an object of the present invention is to provide a compact projection zoom lens effectively eliminating aberrations and improving the projection image quality.

Another object of the present invention is to provide a projection optical system having a projection zoom lens, which has a compact structure and can obtain a high-quality image.

A further object of the present invention is to provide an image-taking optical system having a projection zoom lens, which has a compact structure and can obtain a high-quality image.

To achieve the above objects, a projection zoom lens in accordance with the present invention comprises, from an image side to an object side, a first lens group having a negative refractive power, consisting of a number of lens elements and being movable along the optical axis of the projection zoom lens; a second lens group having a positive refractive power, consisting of a number of lens elements and being movable along the optical axis of the projection zoom lens; and an aperture stop arranged between two lens elements of the second lens group and being axially movable therewith.

The projection zoom lens satisfies the following conditions:

$$-0.90 < \frac{P2}{P1} < -0.78 \tag{1}$$

$$-1.99 < \frac{P1}{PF} < -1.67 \tag{2}$$

$$1.50 < \frac{P2}{PF} < 1.55 \tag{3}$$

$$0.58 < \frac{PF}{BF} < 0.68 \tag{4}$$

$$5.37 < \frac{TT}{PF} < 5.82 \tag{5}$$

$$3.40 < \frac{TT}{BF} < 3.80 \tag{6}$$

$$-1.34 < \frac{EX}{BF} < -1.13 \tag{7}$$

where P1 represents the refractive power of the first lens group, P2 represents the refractive power of the second lens group, PF represents the focal length of the projection zoom lens as a whole at the wide-angle end, BF represents the back focal length of the projection zoom lens as a whole at the wide-angle end, TT represents the total optical track of the projection zoom lens as a whole at the wide-angle end, and EX represents the exit pupil position of the projection zoom lens as a whole at the wide-angle end.

The lens elements of the first and second lens groups are all made of glass.

The projection zoom lens further comprises a cover glass arranged between the second lens group and the object side.

The object side is a surface of an image-forming device, and the image side is a screen side onto which an image is projected.

By zooming the projection zoom lens from the wide-angle end to the telephoto end, the first lens group moves toward the object side, and the second lens group moves toward the image side, and the distance between the first and the second lens groups is shortened.

The focal length of the projection zoom lens varies within the range between 21.333 mm (W), 24.4907 mm (M) and 27.6359 mm (T), and the effective aperture of the projection zoom lens varies between 2.40 (W), 2.57 (M) and 2.73 (T).

The focal length of the projection zoom lens can also vary between 20.439 mm (W), 21.852 mm (M) and 23.545 mm (T), and the effective aperture of the projection zoom lens varies between 2.61 (W), 2.69 (M) and 2.78 (T).

The focal length of the projection zoom lens can also vary between 23.700 mm (W), 26.006 mm (M) and 28.523 mm (T), and the effective aperture of the projection zoom lens varies between 2.48 (W), 2.59 (M) and 2.71 (T).

In comparison with the prior art, the projection zoom lens according to the present invention has a compact structure because of employing the first lens group of negative refractive power and the second lens group of positive refractive power. Moreover, since the present projection zoom lens satisfies seven requisite conditions, all the aberrations can be excellently corrected, and the projection image quality is greatly improved.

BRIEF DESCRIPTION OF THE DRAWINGS

The present invention may best be understood through the following description with reference to the accompanying drawings, in which:

FIG. 1 schematically shows the construction of a projection zoom lens according to a first embodiment of the present invention;

DETAILED DESCRIPTION OF THE PREFERRED EMBODIMENTS

Figure 2A:
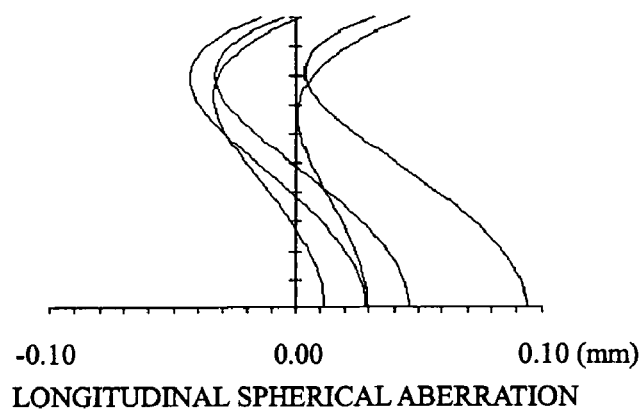
FIGS. 2A–2D respectively show longitudinal spherical aberration, lateral chromatic aberration, field curvature and MTF curves caused by the projection zoom lens shown in FIG. 1 at the wide-angle end.
Figure 2B:
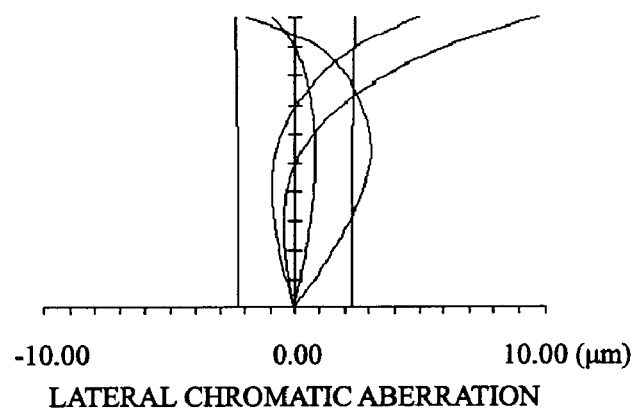
Figure 2C:
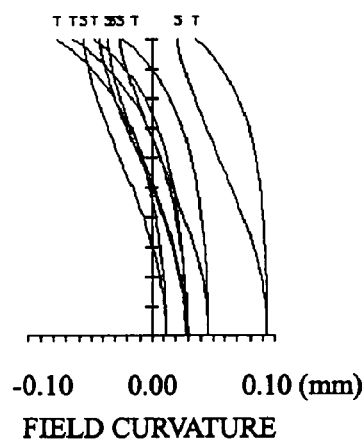
Figure 2D:
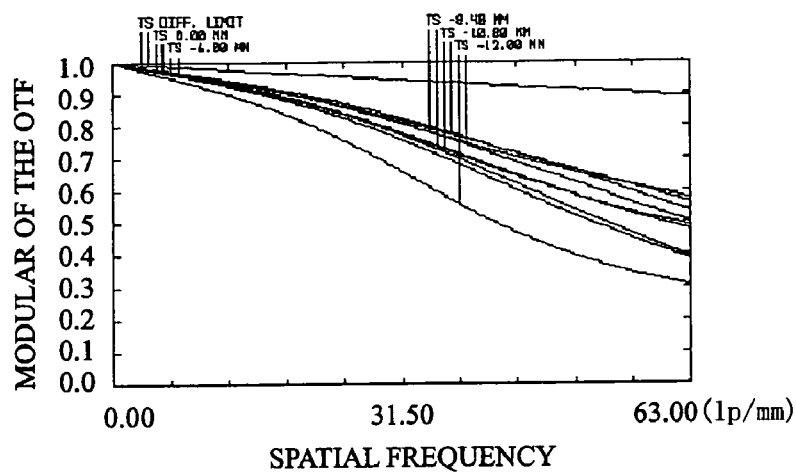
Figure 3A:
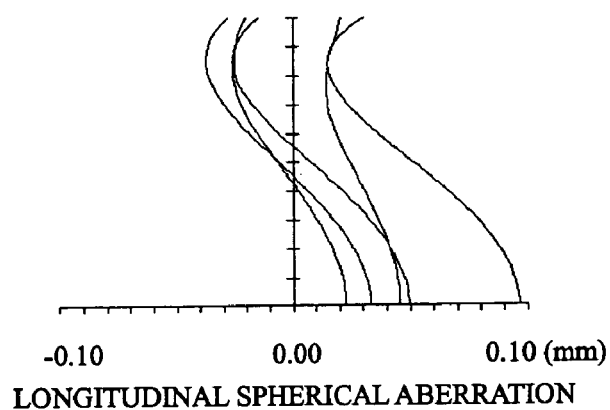
FIGS. 3A–3D respectively show longitudinal spherical aberration, lateral chromatic aberration, field curvature and MTF curves caused by the projection zoom lens shown in FIG. 1 at an intermediate zoom position.
Figure 3B:
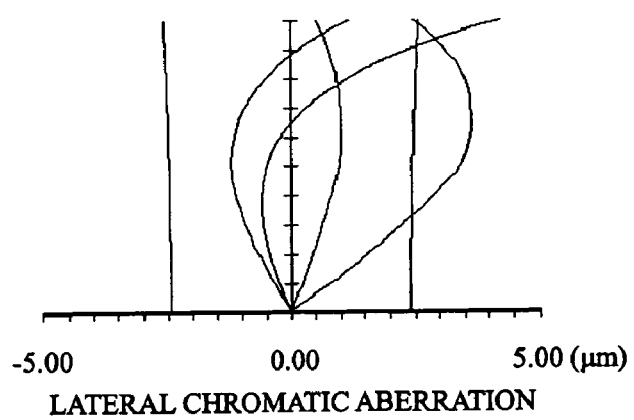
Figure 3C:
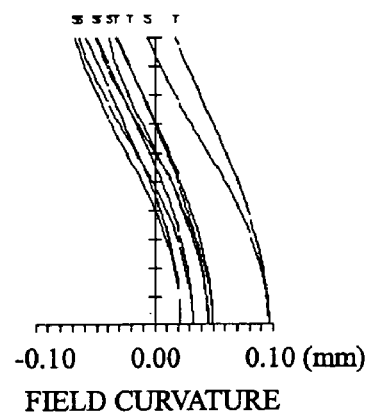
Figure 3D:
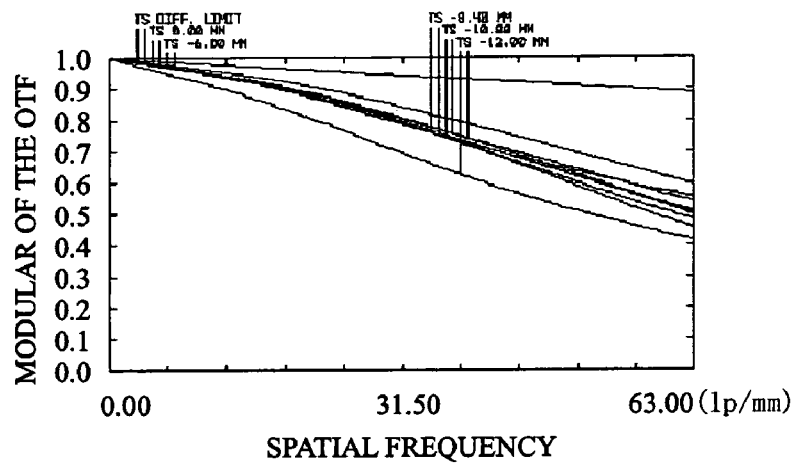
Figure 4A:
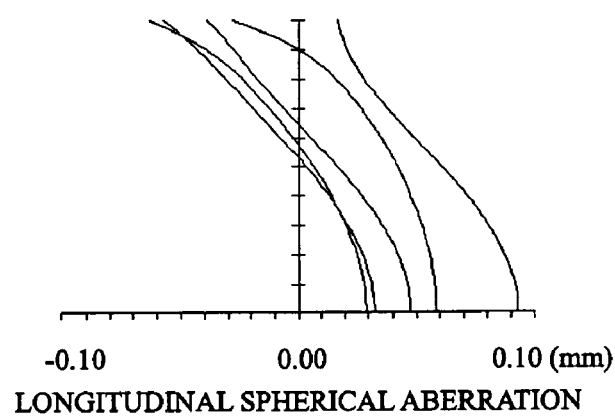
FIGS. 4A–4D respectively show longitudinal spherical aberration, lateral chromatic aberration, field curvature and MTF curves caused by the projection zoom lens shown in FIG. 1 at the telephoto end.
Figure 4B:
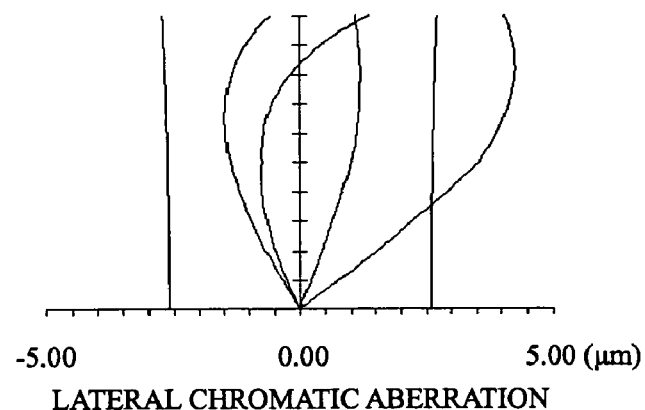
Figure 4C:
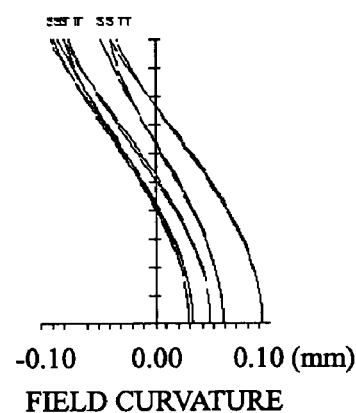
Figure 4D:
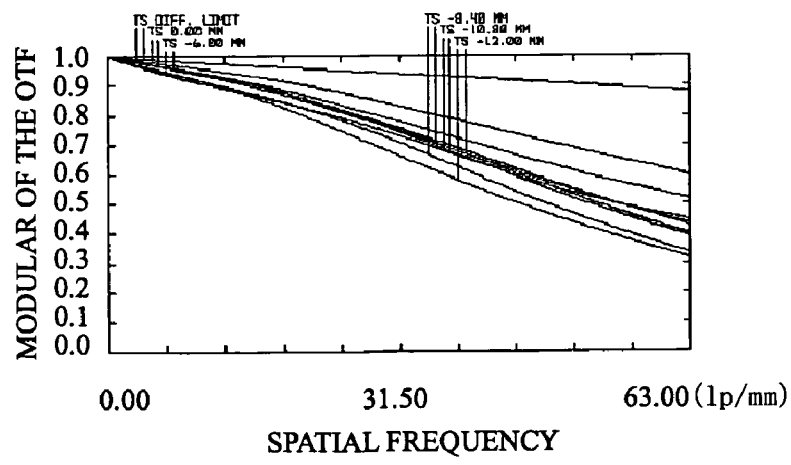
Figure 5:
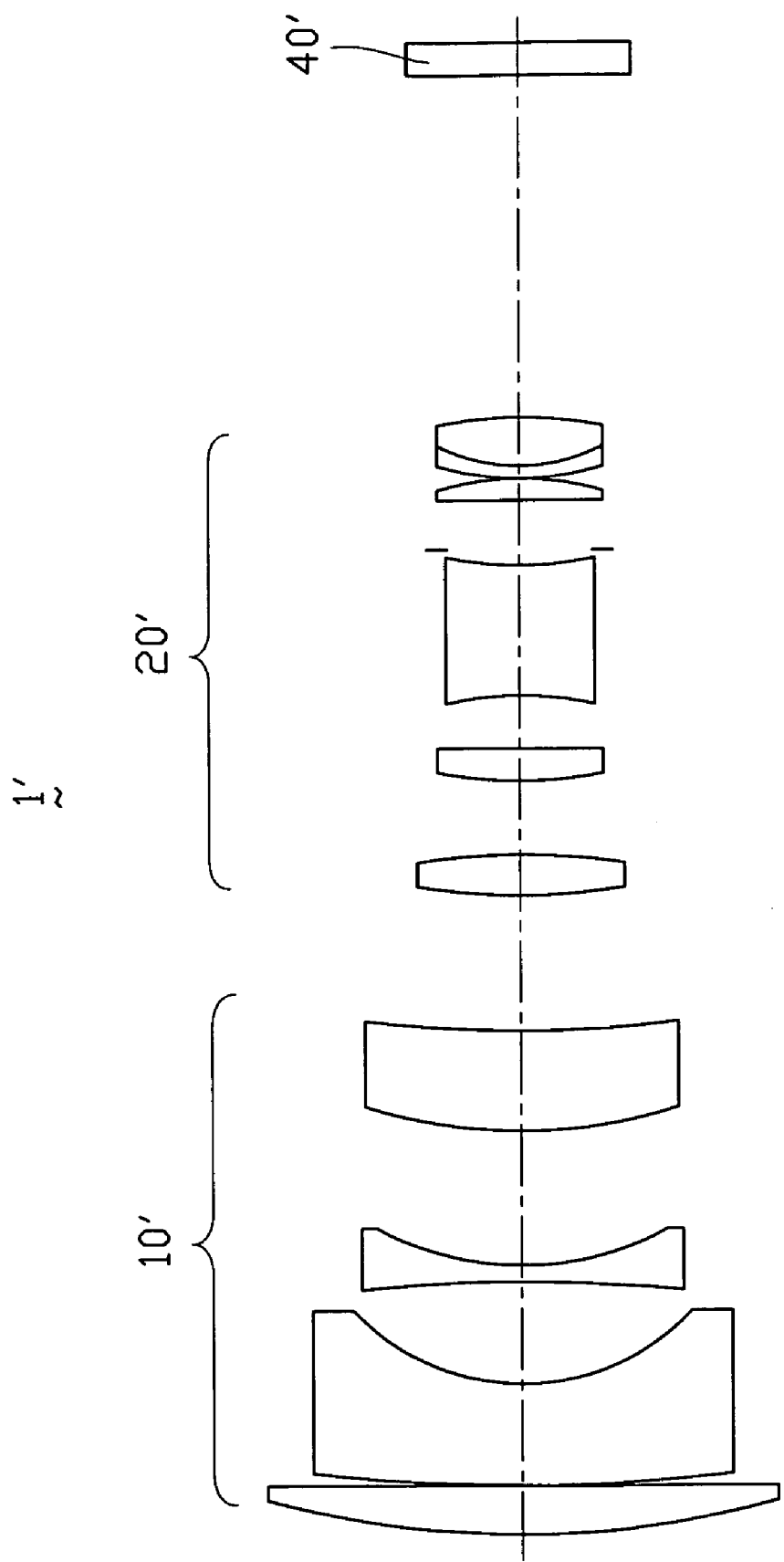
FIG. 5 schematically shows the construction of a projection zoom lens according to a second embodiment of the present invention.
Figure 6A:
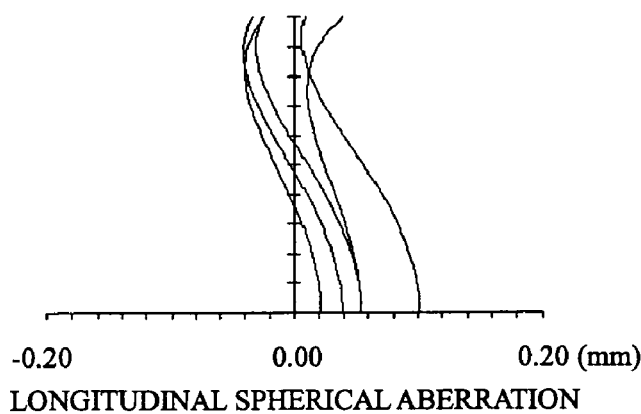
FIGS. 6A–6D respectively show longitudinal spherical aberration, lateral chromatic aberration, field curvature and MTF curves caused by the projection zoom lens shown in FIG. 5 at the wide-angle end.
Figure 6B:
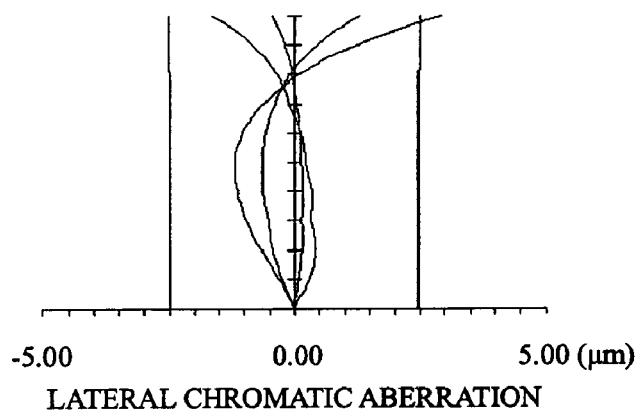
Figure 6C:
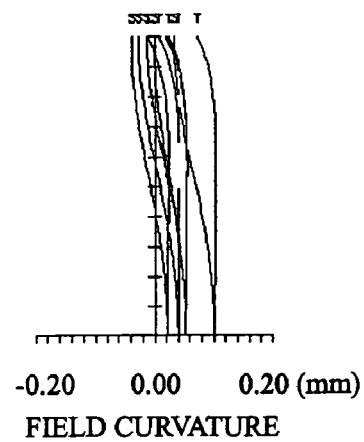
Figure 6D:
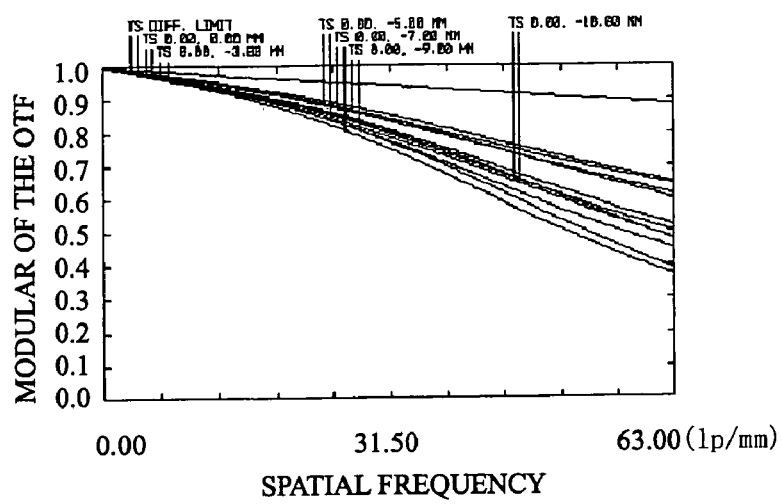
Figure 7A:
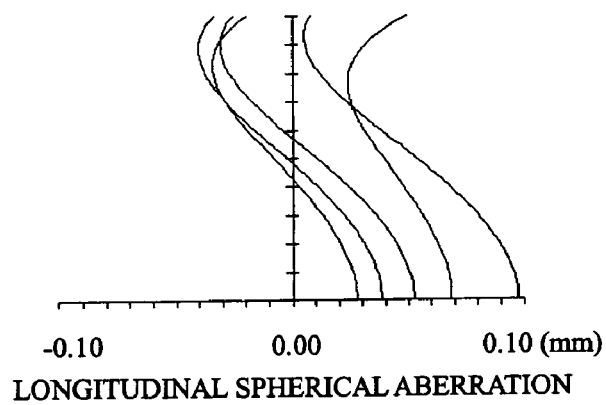
FIGS. 7A–7D respectively show longitudinal spherical aberration, lateral chromatic aberration, field curvature and MTF curves caused by the projection zoom lens shown in FIG. 5 at an intermediate zoom position.
Figure 7B:
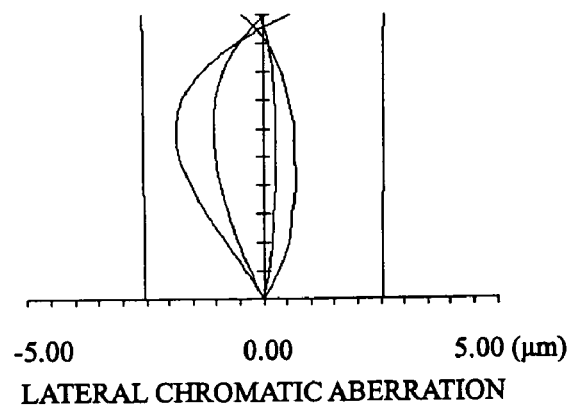
Figure 7C:
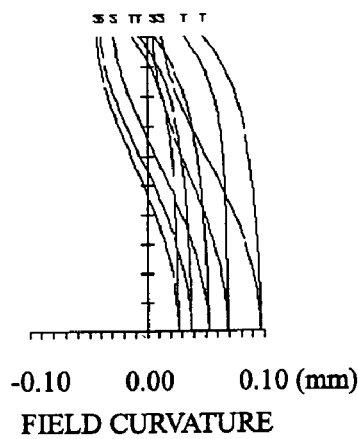
Figure 7D:
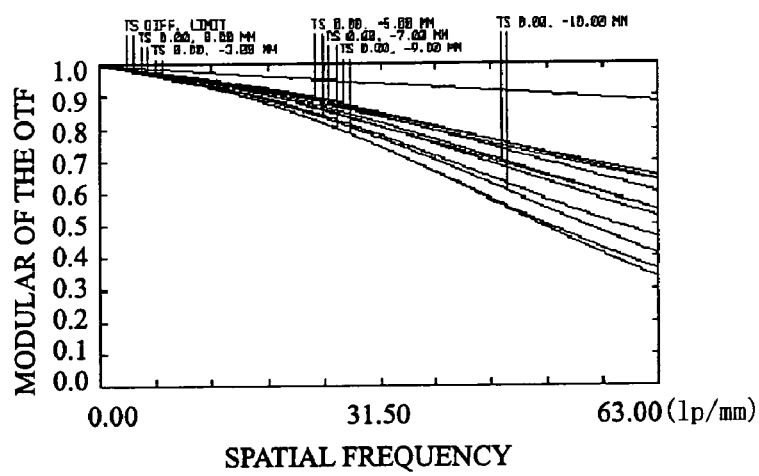
Figure 8A:
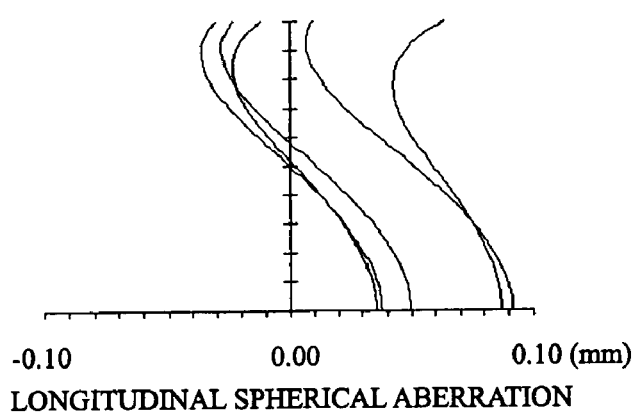
FIGS. 8A–8D respectively show longitudinal spherical aberration, lateral chromatic aberration, field curvature and MTF curves caused by the projection zoom lens shown in FIG. 5 at the telephoto end.
Figure 8B:
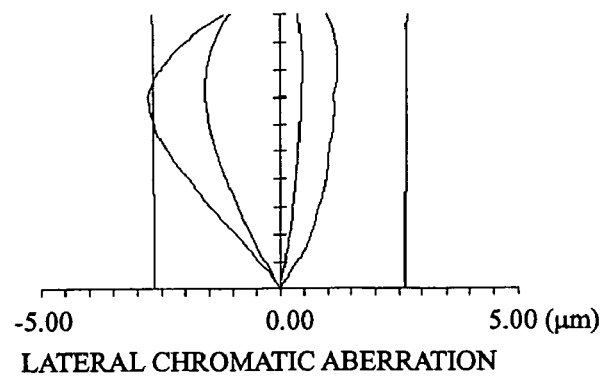
Figure 8C:
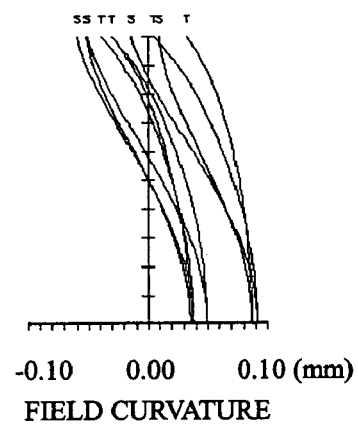
Figure 8D:
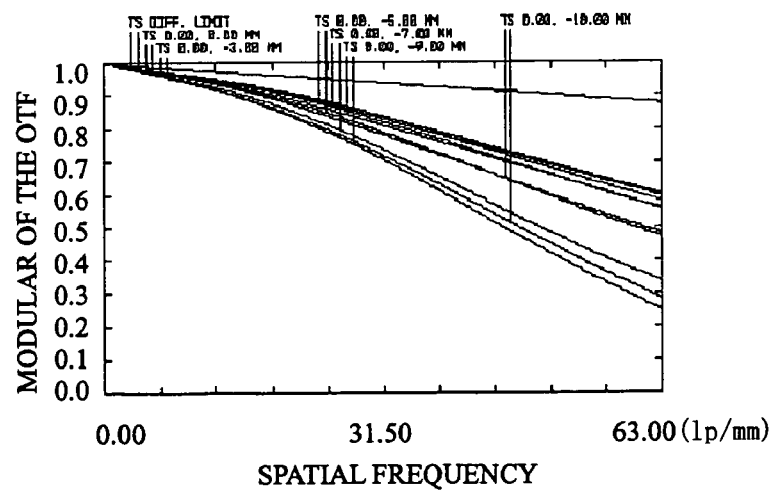
Figure 9:
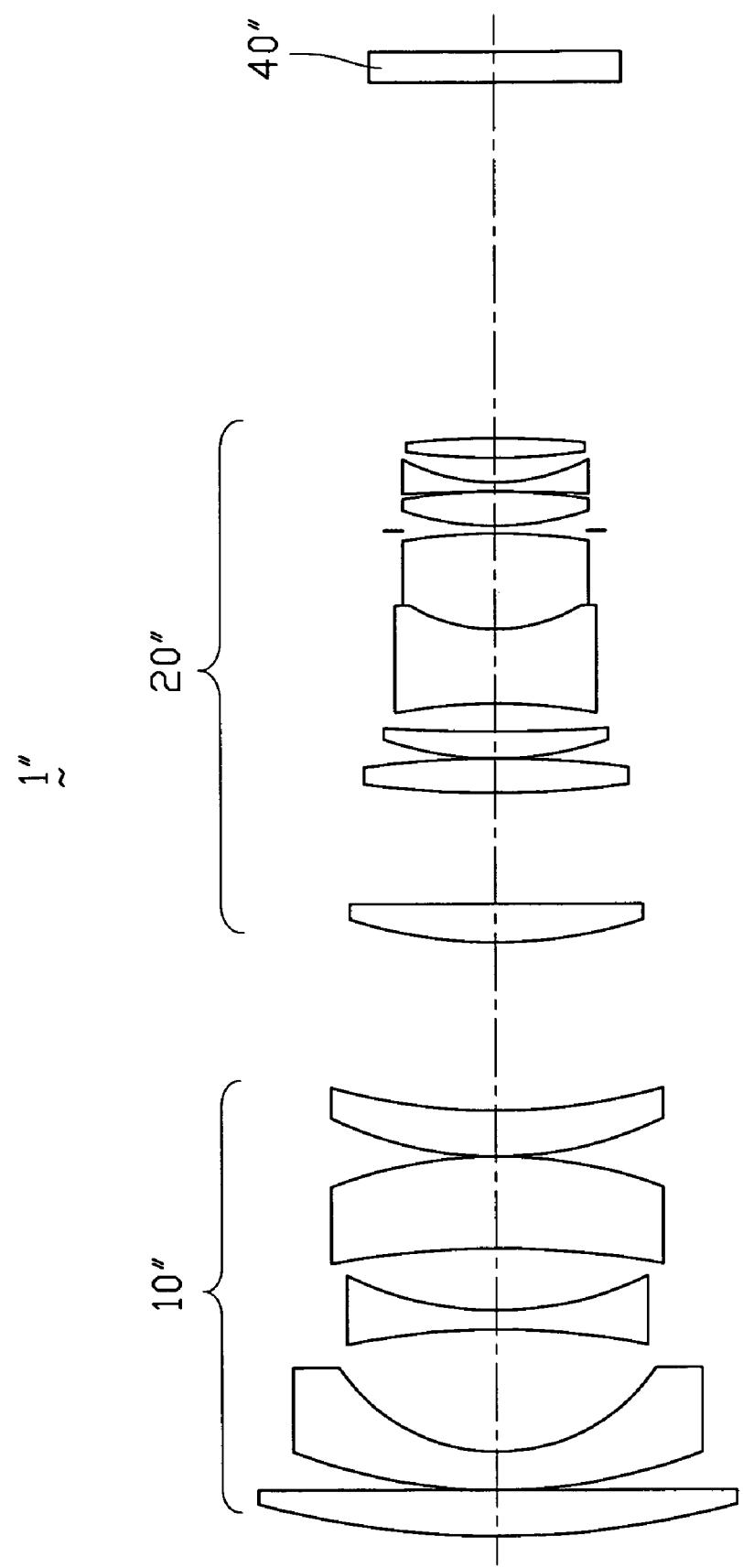
FIG. 9 schematically shows the construction of a projection zoom lens according to a third embodiment of the present invention.
Figure 10A:
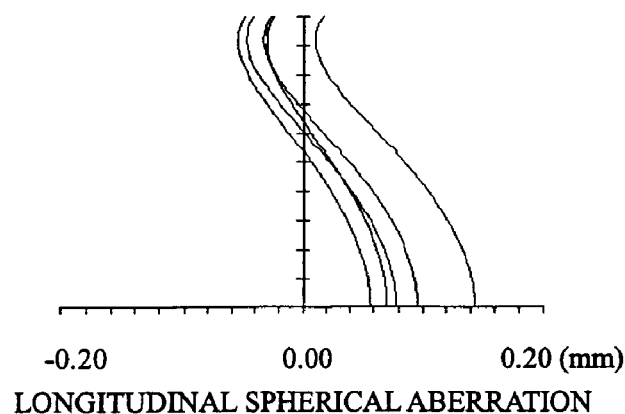
FIGS. 10A–10D respectively show longitudinal spherical aberration, lateral chromatic aberration, field curvature and MTF curves caused by the projection zoom lens shown in FIG. 9 at the wide-angle end.
Figure 10B:
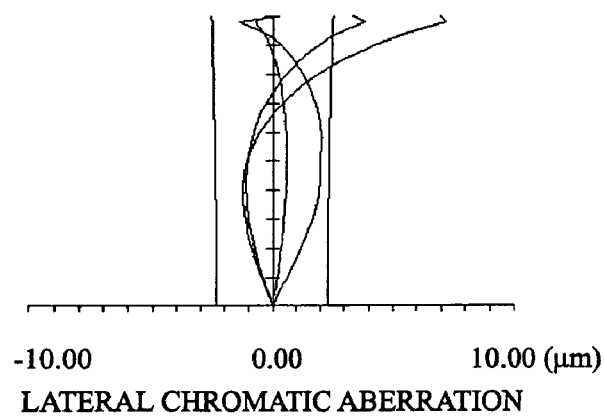
Figure 10C:
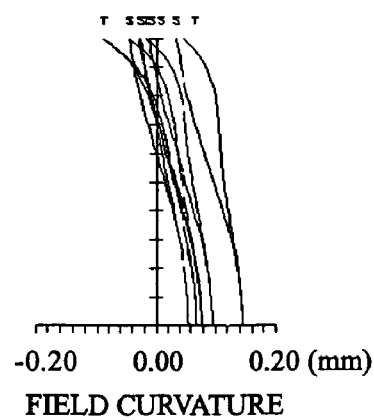
Figure 10D:
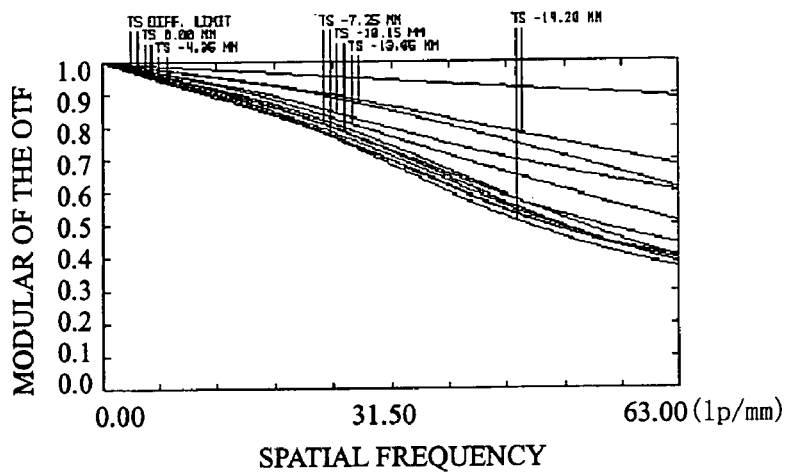
Figure 11A:
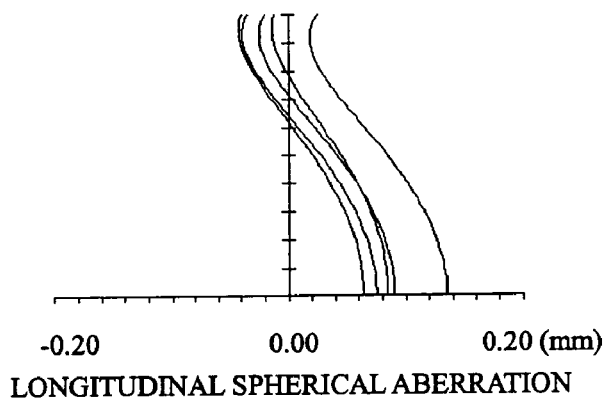
FIGS. 11A–11D respectively show longitudinal spherical aberration, lateral chromatic aberration, field curvature and MTF curves caused by the projection zoom lens shown in FIG. 9 at an intermediate zoom position.
Figure 11B:
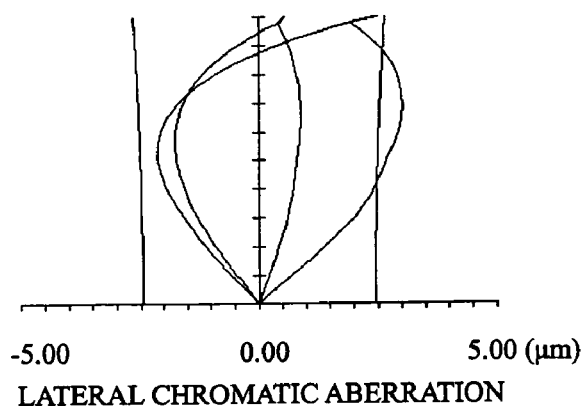
Figure 11C:
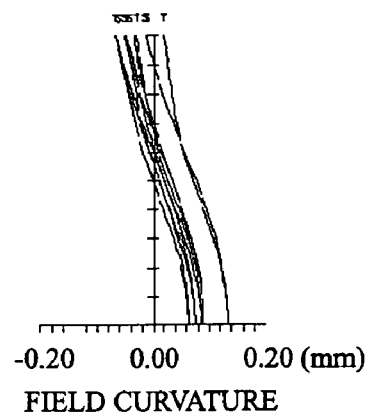
Figure 11D:
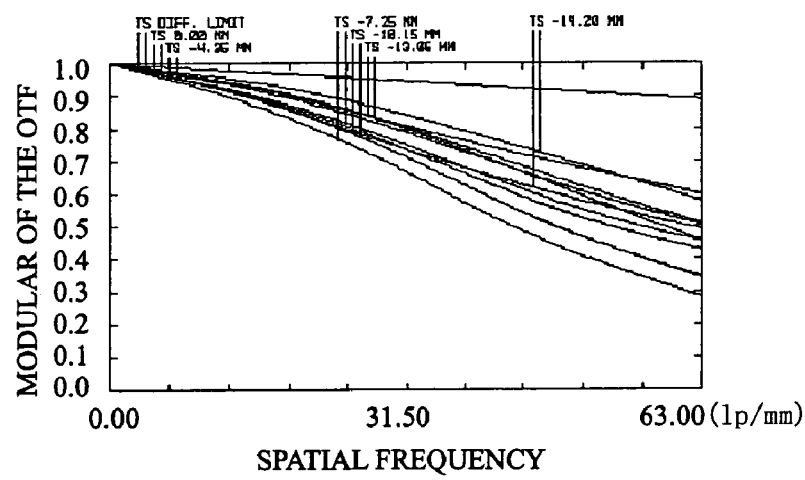
Figure 12A:
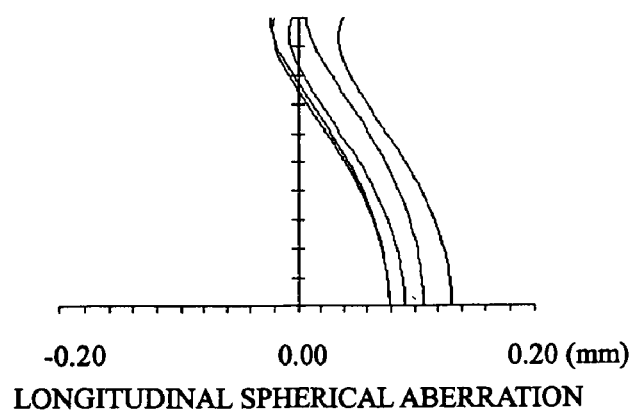
FIGS. 12A–12D respectively show longitudinal spherical aberration, lateral chromatic aberration, field curvature and MTF curves caused by the projection zoom lens shown in FIG. 9 at the telephoto end.
Figure 12B:
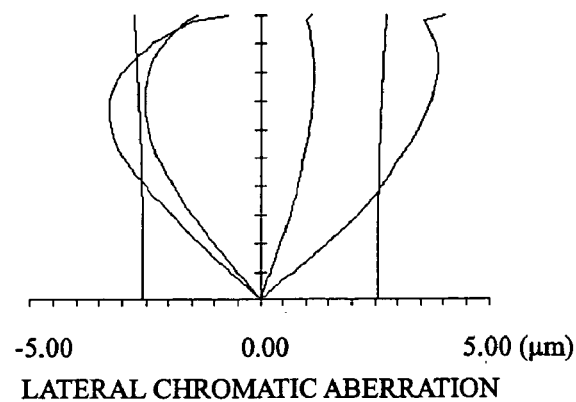
Figure 12C:
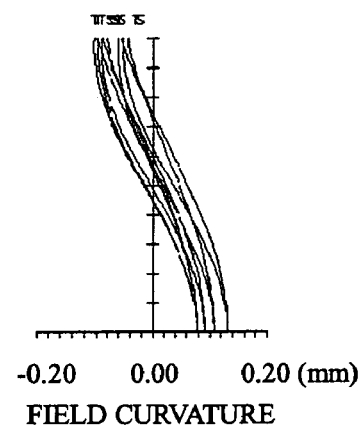
Figure 12D:
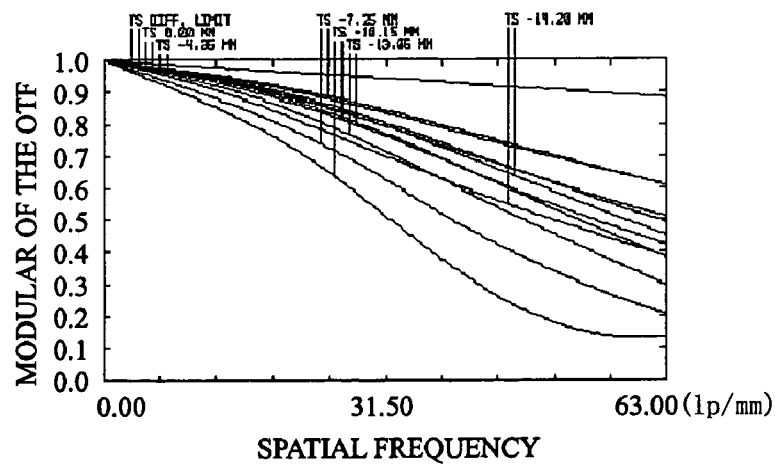

FIGS. 1, 5 and 9 respectively show projection zoom lenses 1, 1', and 1" in accordance with first, second and third embodiments of the present invention. The projection zoom lenses 1, 1', and 1" of the present invention all can be assembled on a DLP projector and can be used for projecting an image formed on an image-forming device (such as a DMD modulator) to a large screen.

The projection zoom lens 1 shown in FIG. 1 comprises, in order from a screen side (the left side as viewed in FIG. 1) to an image plane side (the right side as viewed in FIG. 1), a first lens group 10 having a negative refractive power, and a second lens group 20 having a positive refractive power. The first lens group 10 consists of a plurality of lens elements, which are movable along an optical axis of the projection zoom lens 1 within a first variable distance M1. The second lens group 20 consists of a plurality of lens elements, which are movable along the optical axis within a second variable distance M2. The screen side (not shown) is a plane and the image can be projected thereon. The image plane side (not shown) is a position of the image-forming device. The projection zoom lens 1 further comprises an aperture stop 30 arranged between two lens elements 21 and 22 of the second lens group 20 and being axially movable therewith, and a cover glass 40 arranged between the second lens group 20 and the image forming device and being used for improving the quality of the image formed on the image forming device.

All the lens elements of the first and the second lens groups 10 and 20 are made of glass, and thus the projection zoom lens 1 is heat-resisting and has steady optical performance. The projection zoom lens 1 according to the present invention has a compact structure because of the combination of a positive lens group (the second lens groups 20) and a negative lens group (the first lens groups 10).

FIG. 1 only shows the spatial relationship between the first and second lens groups 10 and 20 at the wide-angle end of the projection zoom lens 1. Zooming the projection zoom lens 1 from the wide-angle end to the telephoto end causes the first lens group 10 to move toward the image plane side, and the second lens group 20 move toward the screen side, and the distance between the first and the second lens groups 10 and 20 is shortened. When the projection zoom lens 1 is employed in a reflecting-type projection optical system, for example a DLP projector, a reflective modulator (such as the DMD modulator) thereof requires long back focal length because the incoming light path and the reflected light path must stay separate from each other, otherwise the image will be affected. The limiting condition of long back focal length of the projection zoom lens 1 will be described in detail in the following text.

The first, the second and the third embodiments of the projection zoom lenses 1, 1', and 1", respectively shown in FIGS. 1, 5 and 9, are only different in the lens configuration and the lens quantity. For effectively eliminating aberrations, all the projection zoom lenses 1, 1', and 1" in the first, the second and the third embodiments must satisfy the following requisite conditions:

$$-0.90 < \frac{P2}{P1} < -0.78 \quad (1)$$

$$-1.99 < \frac{P1}{PF} < -1.67 \quad (2)$$

$$1.50 < \frac{P2}{PF} < 1.55 \quad (3)$$

$$0.58 < \frac{PF}{BF} < 0.68 \quad (4)$$

$$5.37 < \frac{TT}{PF} < 5.82 \quad (5)$$

$$3.40 < \frac{TT}{BF} < 3.80 \quad (6)$$

$$-1.34 < \frac{EX}{BF} < -1.13 \quad (7)$$

where P1 represents the refractive powers of the first lens group 10, 10' and 10", P2 represents the refractive powers of the second lens group 20, 20' and 20", PF represents the focal lengths of the present projection zoom lenses 1, 1' and 1" as a whole at the wide-angle end, BF represents the back focal lengths of the present projection zoom lenses 1, 1' and 1" as a whole at the wide-angle end, TT represents the total optical tracks of the present projection zoom lenses 1, 1' and 1" as a whole at the wide-angle end, and EX represents the exit pupil positions of the present projection zoom lenses 1, 1' and 1" as a whole at the wide-angle end.

If the lower limits of conditions (1) and (2) are transgressed, the field curvature and other aberrations produced by the second lens groups 20, 20' and 20" are so large that it is difficult to correct them with the first lens groups 10, 10' and 10". If the upper limits of conditions (1) and (2) are transgressed, the movement strokes of the first lens groups 10, 10' and 10" are so long that the total optical tracks of the projection zoom lenses 1, 1' and 1" are unduly long.

If the lower limit of condition (3) is transgressed, the movement strokes of the first lens groups 10, 10', and 10" are so long that the total optical tracks of the projection zoom lenses 1, 1', and 1" are unduly long. If the upper limit of condition (3) is transgressed, the lateral chromatic aberrations produced by the second lens groups 20, 20' and 20" will be over corrected.

If the upper limits of conditions (4), (5) and (6) are transgressed, the movement strokes of the back focal lengths of the projection zoom lenses 1, 1' and 1" as a whole at the wide-angle end is unduly long. If the lower limits of conditions (4), (5) and (6) are transgressed, the refractive powers of the projection zoom lenses 1, 1' and 1" as a whole are too low, and said lower refractive powers affect the optical performances of the projection zoom lenses 1, 1' and 1".

If the upper limit of condition (7) is transgressed, the refractive powers of the projection zoom lenses 1, 1', and 1" as a whole are too low. If the lower limit of condition (7) is transgressed, the projection zoom lenses 1, 1', and 1" as a whole substantially become telemetric zoom lenses.

In fact, the projection zoom lenses 1, 1' and 1" respectively described by the three embodiments are all reverse-telephoto lenses, wherein the screen side (the side onto which an image is projected) is regarded as an image side, the image plane side (the side which is a surface of the image-forming device, for example, the DMD modulator) is regarded as an object side. However, when the optical performances of the projection zoom lenses 1, 1' and 1" of these examples are evaluated on the display device surface, the screen side may be regarded as the object plane, and the projection zoom lenses 1, 1', and 1" are all assumed to be designs as reduction optical systems in optical terms.

In the first embodiment, the projection zoom lens 1 comprises the first lens group 10 consisting of four lens elements, the second lens group 20 consisting of seven lens elements, and one cover glass 40. In the second embodiment, the projection zoom lens 1' comprises the first lens group 10' consisting of four lens elements, the second lens group 20' consisting of six lens elements, and one cover glass 40'. In the third embodiment, the projection zoom lens 1" comprises the first lens group 10" consisting of five lens elements, the second lens group 20" consisting of eight lens elements, and one cover glass 40".

All the construction parameters of the lens elements in the first, the second, and the third embodiments will be shown below.

In Data Tables 1, 2, and 3 given below, "i" represents the order of the surface from the screen side (including lens surface, the aperture stop and the cover glass), "Ri" represents the radius of curvature (mm) of the ith surface, "D" represents the ith member thickness or the distance (mm) between the ith surface and the (i+1)th surface, and "Nd" and "Vd" respectively represent the refractive index (d-line) and Abbe number (d-line) of the ith member. Also, "F" represents the focal length of the projection zoom lens as a whole, "W" represents the wide-angle end of the projection zoom lens, "M" represents an intermediate zoom position of the projection zoom lens, "T" represents the telephoto end of the projection zoom lens, and "FNO" represents the effective aperture of the projection zoom lens.

DATA TABLE 1

Construction Parameter Of Lens Elements of the First Embodiment
F = 21.333 mm(W)~24.4907 mm(M)~27.6359 mm(T)
FNO = 2.40(W)~2.57(M)~2.73(T)

| Surface (i) | Ri (mm) | D (mm) | Nd | Vd |
|---|---|---|---|---|
| 1 | 81.7 | 4.46 | 1.58913 | 61.20 |
| 2 | ∞ | 0.10 | | |
| 3 | 52.3 | 2.55 | 1.48749 | 70.21 |
| 4 | 20.0 | 8.38 | | |
| 5 | −172.4 | 1.60 | 1.83481 | 42.72 |
| 6 | 26.4 | 10.52 | | |
| 7 | 40.3 | 9.60 | 1.84666 | 23.80 |
| 8 | 85.81 | 15.961(W)~9.094(M)~3.813(T) | | |
| 9 | 70.2 | 3.78 | 1.72916 | 54.68 |
| 10 | −70.2 | 0.10 | | |
| 11 | 36.6 | 2.61 | 1.83481 | 42.72 |
| 12 | 158.9 | 3.00 | | |
| 13 | −43 | 7.24 | 1.80440 | 39.58 |
| 14 | 15.1 | 0 | | |
| 15 | 15.1 | 9.50 | 1.49700 | 81.61 |
| 16 | −106 | 0.10 | | |
| 17 | 26.2 | 3.44 | 1.83481 | 42.72 |
| 18 | −44.8 | 0.11 | | |
| 19 | −139.4 | 0.90 | 1.68893 | 31.10 |
| 20 | 18 | 1.73 | | |
| 21 | 67.7 | 2.02 | 1.80400 | 46.58 |
| 22 | −67.7 | 33.00(W)~35.92(M)~38.83(T) | | |
| 23 | ∞ | 3.00 | 1.48749 | 70.41 |
| 24 | ∞ | 0.50 | | |

Aberrations of the projection zoom lens 1 according to the first embodiment as show in Data Table 1 can be effectively corrected and are respectively shown in FIGS. 2A–2D, 3A–3D and 4A–4D.

DATA TABLE 2

Construction Parameter Of Lens Elements of the Second Embodiment
F = 20.439 mm(W)~21.852 mm(M)~23.545 mm(T)
FNO = 2.61(W)~2.69(M)~2.78(T)

| Surface (i) | Ri (mm) | D (mm) | Nd | Vd |
|---|---|---|---|---|
| 1 | 105.9 | 3.1 | 1.72916 | 54.68 |
| 2 | ∞ | 0.10 | | |
| 3 | 120.4 | 9.58 | 1.74950 | 35.30 |
| 4 | 20.1 | 6.28 | | |
| 5 | −149 | 1.40 | 1.49700 | 81.61 |
| 6 | 30.3 | 9.93 | | |
| 7 | 39.0 | 8.05 | 1.84666 | 23.80 |
| 8 | 71.2 | 11.216(W)~7.658(M)~3.955(T) | | |
| 9 | 89.9 | 3.02 | 1.84666 | 23.80 |
| 10 | −70.2 | 5.32 | | |
| 11 | 28.7 | 2.44 | 1.83481 | 54.68 |
| 12 | 187.9 | 4.12 | | |
| 13 | −41.5 | 9.70 | 1.69895 | 30.10 |
| 14 | 28.8 | 5.12 | | |
| 15 | 248.3 | 1.85 | 1.49700 | 81.61 |
| 16 | −33.4 | 0.10 | | |
| 17 | 34.4 | 0.80 | 1.67270 | 32.10 |
| 18 | 19.2 | 0 | | |
| 19 | 19.2 | 3.38 | 1.49700 | 81.61 |
| 20 | −71.5 | 27.03(W)~28.31(M)~29.86(T) | | |
| 21 | ∞ | 3.00 | 1.48749 | 70.41 |
| 22 | ∞ | 0.50 | | |

Aberrations of the projection zoom lens 1' according to the first embodiment as show in Data Table 2 can be effectively corrected and are respectively shown in FIGS. 6A–6D, 7A–7D and 8A–8D.

DATA TABLE 3

F = 23.700 mm(W)~26.006 mm(M)~28.523 mm(T)
FNO = 2.48(W)~2.59(M)~2.71(T)

| Surface (i) | Ri (mm) | D (mm) | Nd | Vd |
|---|---|---|---|---|
| 1 | 117.1 | 3.45 | 1.72916 | 54.68 |
| 2 | ∞ | 0.10 | | |
| 3 | 92.5 | 2.66 | 1.69680 | 55.53 |
| 4 | 22.2 | 10.81 | | |
| 5 | −63.2 | 1.40 | 1.59270 | 35.30 |
| 6 | 46.4 | 5.00 | | |
| 7 | −85.8 | 7.51 | 1.83481 | 42.72 |
| 8 | −59 | 0.10 | | |
| 9 | 41.7 | 4.17 | 1.84666 | 23.80 |
| 10 | 65.3 | 15.13(W)~8.62(M)~2.72(T) | | |
| 11 | 56.9 | 3.27 | 1.83481 | 42.72 |
| 12 | 2134.1 | 9.64 | | |
| 13 | 95.4 | 2.10 | 1.72916 | 54.68 |
| 14 | −181.9 | 0.10 | | |
| 15 | 36.8 | 1.85 | 1.72916 | 54.68 |
| 16 | 87 | 2.04 | | |
| 17 | −48.2 | 5.37 | 1.80440 | 39.58 |
| 18 | 15.7 | 0 | | |
| 19 | 15.7 | 8.70 | 1.49700 | 81.61 |
| 20 | −87.8 | 0.36 | | |
| 21 | 25.7 | 3.56 | 1.83481 | 42.72 |
| 22 | −52.4 | 0.14 | | |
| 23 | −308.3 | 0.80 | 1.64769 | 33.80 |
| 24 | 17.0 | 2.30 | | |
| 25 | 87.2 | 1.71 | 1.48749 | 70.41 |
| 26 | −87.2 | 31.50(W)~33.56(M)~35.38(T) | | |
| 27 | ∞ | 3.00 | 1.48749 | 70.41 |
| 28 | ∞ | 0.50 | | |

Aberrations of the projection zoom lens 1" according to the first embodiment as show in Data Table 3 can be effectively corrected and are respectively shown in FIGS. 10A–10D, 11A–11D, and 12A–12D.

The projection zoom lens can be used in a projector employing the DMD modulator to make the projector compact, and improve the optical performance of the projector. Moreover, the projection zoom lens can be also used in other projection optical system and other image-taking optical system for improving optical performances.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A projection zoom lens comprising, from an image side to an object side, a first lens group having a negative refractive power, consisting of a number of lens elements and being movable along an optical axis of the projection zoom lens; a second lens group having a positive refractive power, consisting of a number of lens elements and being movable along the optical axis of the projection zoom lens; and an aperture stop arranged between two lens elements of the second lens group and being axially movable therewith; the projection zoom lens satisfying the following conditions:

−0.90<P2/P1<−0.78
−1.99<P1/PF<−1.67
1.50<P2/PF<1.55
0.58<PF/BF<0.68
5.37<TT/PF<5.82
3.40<TT/BF<3.80
−1.34<EX/BF<−1.13

Where P1 represents the refractive power of the first lens group, P1 represents the refractive power of the second lens group, PF represents the focal length of the projection zoom lens as a whole at the wide-angle end, BF represents the back focal length of the projection zoom lens as a whole at the wide-angle end, TT represents the total optical track of the projection zoom lens as a whole at the wide-angle end, and EX represents the exit pupil position of the projection zoom lens as a whole at the wide-angle end.

2. The projection zoom lens as claimed in claim 1, wherein lens elements of the first and second lens groups are made of glass.

3. The projection zoom lens as claimed in claim 1 further comprising a cover glass arranged between the second lens group and the object side.

4. The projection zoom lens as claimed in claim 1, wherein the object side is a surface of an image-forming device, and the image side is a screen side onto which an image is projected.

5. The projection zoom lens as claimed in claim 1, wherein the first lens group is movable toward the object side, and the second lens group is movable toward the image side, and the distance between the first and the second lens groups is shortened when zooming the projection zoom lens from the wide-angle end to the telephoto end.

6. The projection zoom lens as claimed in claim 5, wherein the focal length varies between 21.333 mm (W), 24.4907 mm (M) and 27.6359 mm (T), and the effective aperture varies between 2.40 (W), 2.57 (M) and 2.73 (T).

7. The projection zoom lens as claimed in claim 5, wherein the focal length varies between 20.439 mm (W), 21.852 mm (M) and 23.545 mm (T), and the effective aperture varies between 2.61 (W), 2.69 (M) and 2.78 (T).

8. The projection zoom lens as claimed in claim 5, wherein the focal length varies between 23.700 mm (W), 26.006 mm (M) and 28.523 mm (T), and the effective aperture varies between 2.48 (W), 2.59 (M) and 2.71 (T).

9. A projection optical system comprising an image-forming device for forming an image, and a projection zoom lens for projecting the image, wherein said projection zoom lens comprising, from an image side to an object side, a first lens group having a negative refractive power, consisting of a number of lens elements and being movable along an optical axis of the projection zoom lens; a second lens group having a positive refractive power, consisting of a number of lens elements and being movable along the optical axis of the projection zoom lens; and an aperture stop arranged between two lens elements of the second lens group and being axially movable therewith; the projection zoom lens satisfying the following conditions:

$$-0.90 < \frac{P2}{P1} < -0.78$$

$$-1.99 < \frac{P1}{PF} < -1.67$$

$$1.50 < \frac{P2}{PF} < 1.55$$

$$0.58 < \frac{PF}{BF} < 0.68$$

$$5.37 < \frac{TT}{PF} < 5.82$$

$$3.40 < \frac{TT}{BF} < 3.80$$

$$-1.34 < \frac{EX}{BF} < -1.13$$

where P1 represents the refractive power of the first lens group, P2 represents the refractive power of the second lens group, PF represents the focal length of the projection zoom lens as a whole at the wide-angle end, BF represents the back focal length of the projection zoom lens as a whole at the wide-angle end, TT represents the total optical track of the projection zoom lens as a whole at the wide-angle end, and EX represents the exit pupil position of the projection zoom lens as a whole at the wide-angle end.

10. The projection optical system as claimed in claim 9, wherein the image-forming device comprises a reflective modulator.

11. The projection optical system as claimed in claim 10, wherein the image-forming device comprises a DMD modulator.

12. The projection optical system as claimed in claim 10, wherein the projection zoom lens has a long back focal length.

13. An image-taking optical system comprising at least a projection zoom lens, which comprising, from an image side to an object side, a first lens group having a negative refractive power, consisting of a number of lens elements and being movable along an optical axis of the projection zoom lens; a second lens group having a positive refractive power, consisting of a number of lens elements and being movable along the optical axis of the projection zoom lens; and an aperture stop arranged between two lens elements of the second lens group and being axially movable therewith; the projection zoom lens satisfying the following conditions:

$$-0.90 < \frac{P2}{P1} < -0.78$$

$$-1.99 < \frac{P1}{PF} < -1.67$$

$$1.50 < \frac{P2}{PF} < 1.55$$

$$0.58 < \frac{PF}{BF} < 0.68$$

$$5.37 < \frac{TT}{PF} < 5.82$$

$$3.40 < \frac{TT}{BF} < 3.80$$

$$-1.34 < \frac{EX}{BF} < -1.13$$

where P1 represents the refractive power of the first lens group, P2 represents the refractive power of the second lens group, PF represents the focal length of the projection zoom lens as a whole at the wide-angle end, BF represents the back focal length of the projection zoom lens as a whole at the wide-angle end, TT represents the total optical track of the projection zoom lens as a whole at the wide-angle end, and EX represents the exit pupil position of the projection zoom lens as a whole at the wide-angle end.

* * * * *